June 6, 1944.  L. P. GROBEL  2,350,753
LIQUID SEAL
Filed March 8, 1943

Inventor:
Lloyd P. Grobel,
by Harry E. Dunham
His Attorney.

Patented June 6, 1944

2,350,753

UNITED STATES PATENT OFFICE 2,350,753

LIQUID SEAL

Lloyd P. Grobel, Schenectady, N. Y., assignor to General Electric Company, a corporation of New York Application March 8, 1943, Serial No. 478,362

2 Claims. (Cl. 286—9)

My invention relates to liquid seals for preventing the escape of gas between the shaft and the enclosing casing of gas filled machines, such as hydrogen cooled dynamo-electric machines.

This application is directed to an improvement of a liquid film seal disclosed in Patent 2,236,274, Rice et al., assigned to the assignee of this application.

In dynamo-electric machines of this type, an enclosing casing is provided which is filled with a ventilating gas adapted to be circulated therein and through the machine to ventilate the various windings and parts of the machine. Openings are arranged in the ends of the enclosing casing for the shaft of the machine, and bearings are arranged adjacent the ends of the enclosing casing to support the shaft and the rotatable member of the machine. In order to prevent the loss of ventilating gas from the enclosing casing by leakage into the surrounding atmosphere and to prevent contamination of the ventilating gas in the enclosing casing by leakage of air thereinto around the shaft, a seal is provided between the shaft and the enclosing casing at each of the openings in the casing.

An object of my invention is to provide an improved sealing arrangement of the liquid type for gas filled machines.

Another object of my invention is to provide an improved sealing arrangement for the shaft of a gas filled machine operable under different gas pressures.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
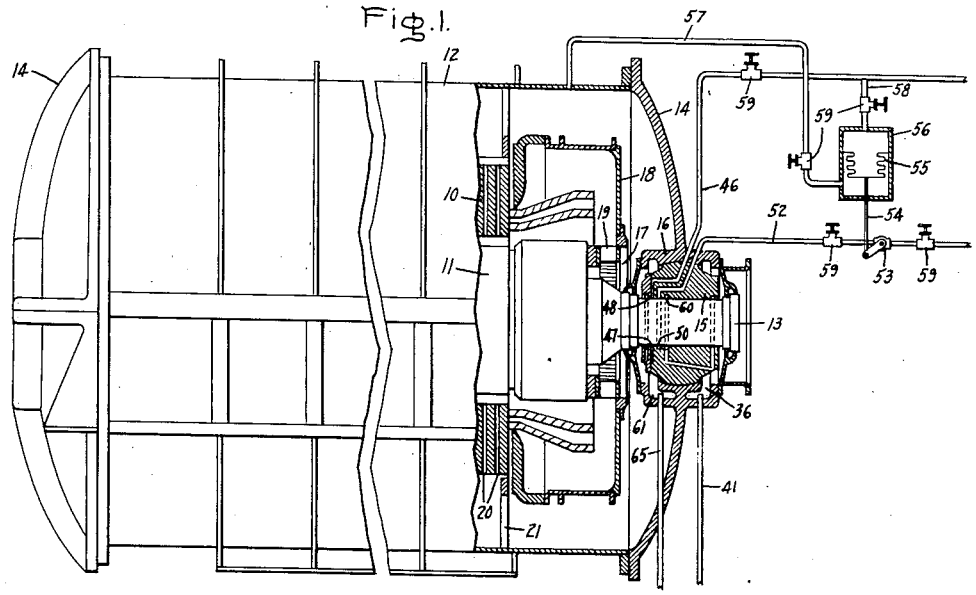
Figure 2:
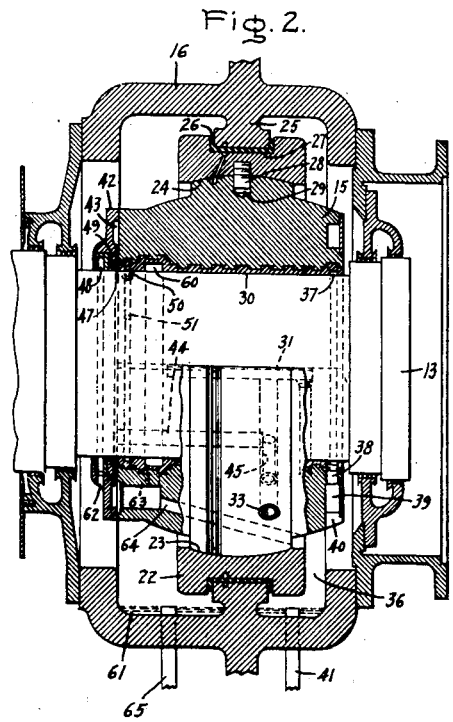
Figure 3:
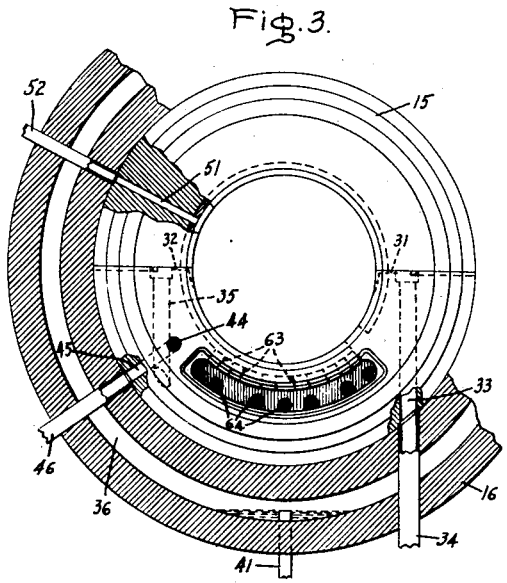

In the drawing, Fig. 1 is a side elevational view, partly in section, of a gas filled dynamo-electric machine provided with an embodiment of my invention; Fig. 2 is an enlarged sectional view of one of the bearings showing details of the liquid seal shown in Fig. 1; and Fig. 3 is a fragmentary end view, partly in section, of the bearing and seal shown in Fig. 2.

Referring to the drawing, I have shown a dynamo-electric machine including a stationary member 10 and a rotatable member 11 about which an enclosing casing 12 is arranged which is filled with a ventilating gas other than air, such as hydrogen. The rotatable member 11 is mounted on a shaft 13 which extends through end walls 14 of the enclosing casing 12. The shaft 13 is supported in bearings 15 mounted in bearing housings 16 carried by the end walls 14 of the enclosing casing 12. In order to ventilate and cool the dynamo-electric machine effectively, the ventilating gas within the enclosing casing 12 is circulated therein and through the various windings and parts of the machine and gas coolers. This gas is drawn from the end of the enclosing casing 12 through an opening 17 provided in the end of a fan casing 18 surrounding a fan 19 carried by the rotatable member 11 and is discharged into the air gap between the stationary member 10 and the rotatable member 11 of the dynamo-electric machine and into the axial ventilating passages. The ventilating gas then flows outwardly through a plurality of radially disposed ducts 20 arranged between the laminations of the stationary member 10 into a plurality of passages 21 extending between the ends of the enclosing casing 12 and arranged between the enclosing casing and the stationary member 10.

Under various operating conditions of the dynamo-electric machine, it is desirable to maintain different ventilating gas pressures within the enclosing casing 12. This may be accomplished in any suitable manner by controlling the amount of gas supplied to the casing. Under such conditions, it is desirable that a seal be provided about the shaft substantially to prevent the escape of gas from the casing. As shown in detail in Figs. 2 and 3, each of the bearing housings 16 is provided with a split supporting ring 22 having a universal joint bearing support including a concave surface 23 which engages a convex surface 24 provided on the bearing element 15 for supporting the bearing element to provide for alignment thereof with respect to the shaft 13. It also is desirable that the bearing should be electrically insulated from the machine end shield. In order thus to insulate and support the bearing 15, the bearing housing 16 is formed with an inwardly extending annular flange 25 which engages a split annular channel insulating ring 26 arranged in a circumferentially extending groove 27 formed around the outer surface of the split supporting ring 22. A dowel pin 28 is threadedly secured to the supporting ring 22 and extends into a socket 29 in the outer face of the bearing to secure it in position with respect to the stationary bearing housing 16. The bearing element 15 is also provided with a cylindrical bearing face 30 in which an end of the shaft 13 is journaled. An axially extending recess 31 is provided on one side of the bearing face 30 adjacent the shaft 13 for supplying lubricant under pressure between the bearing face 30 and the shaft 13, and a similar axially extending recess 32 is formed in the bearing face on the other side to drain off excess lubricant. The recess 31 communicates with the passage 33 formed in the bearing element 15 and in lubricant supply pipe 34 secured to the bearing housing 16. The drain recess 32 communicates with a drain passage 35 extending through the bearing element 15 and communicates with an enlarged chamber 36 formed in the bearing housing 16 to provide a bearing lubricant sump adjacent the outer end of the shaft 13. An annular groove 37 is formed in the bearing face 30 adjacent the outer end of the shaft 13 so that lubricant which flows outwardly along the shaft will be drained therein. A plurality of openings 38 extend outwardly from the groove 37 to an annular drainage chamber 39 formed on the outer edge of the bearing, and lubricant collected in the groove 37 drains through these openings 38, through the chamber 39, and out to the lubricant sump 36 through openings 40 which extend between the chamber 39 and the sump 36. The excess lubricant in the sump 36 is drained by a drain pipe 41 and is returned to any suitable ventilating and recirculating system used in connection with the bearing oil supply.

A shaft sealing member is provided which includes an annular sealing ring 42 rigidly connected to the inner end of the bearing element 15 adjacent the interior of the enclosing casing 12 and cooperates with the bearing element 15 to provide an annular chamber surrounding the shaft 13 and containing sealing liquid under pressure for providing a main seal of the liquid film type about the shaft 13 and for substantially preventing the escape of gas from the enclosing casing 12 about the shaft 13. The sealing liquid which comprises lubricant of the character of that supplied to the bearing face is supplied to the chamber 43 under pressure through passages 44 and 45 formed in the bearing element 15 which communicates with a sealing fluid supply pipe 46 secured to the bearing housing 16. The inner portion of the face of the annular sealing ring 42 adjacent the inner end of the bearing element 15 is spaced axially a short distance therefrom to provide a narrow annular passage 47 between the chamber 43 and the surface of the shaft 13. An annular recess 48 is provided in the sealing ring 42 and is interposed between the narrow annular passage 47 and the interior of the enclosing casing 12 and is separated from the narrow passage 47 by a dividing wall 49. Another sealing surface is provided between the outer face of the sealing ring 42 and the annular passage 47 therein.

Under certain conditions of high ventilating gas pressure in the casing about the dynamo-electric machine, there may be a tendency for the ventilating medium to blow through the liquid film seal formed by the liquid passing from the annular passage 47 resulting in loss of lubricating oil for the bearings and consequent damage thereto. In order to prevent this possible failure of the main seal, an arrangement is provided including a second liquid film seal on the outer side of the annular passage 47 adapted to be formed by sealing liquid passing inwardly of the casing towards the passage 47 from an annular sealing groove liquid supply 50 axially spaced from the first sealing groove 47, as shown in Figs. 1 and 2. Sealing liquid is supplied to the groove 50 under pressure under certain predetermined conditions through an outwardly extending passage 51 formed through the bearing 15, to which sealing liquid is supplied by a supply tube 52 secured to the bearing housing 16. The supply tube 52 is connected to a source of sealing liquid having a pressure substantially above the pressure of the ventilating gas in the casing about the machine when the machine is operating under high gas pressure. A control valve 53 is arranged between the source of supply of the high pressure sealing liquid and the supply tube 52 and is operated in response to the relative pressure of the gas in the casing and of the pressure of the sealing liquid supplied through the supply tube 46 to the first-mentioned liquid seal for the bearing. This operation may be obtained in any suitable manner, and, as shown in the drawing, the valve 53 is connected to an operating rod 54 secured to a bellows element 55 arranged in a cylinder 56. One side of the bellows 55 is subjected to the pressure of the ventilating gas in the casing 12 by being connected thereto through a tube 57, and the other side of the bellows is connected to the first liquid seal supply tube 46 by a tube 58. Suitable shut-off valves 59 are arranged in each of the tubes to control the supply of fluid by manual means if desired. With this arrangement, the valve 53 is adapted to throttle or control the supply of high pressure sealing liquid to the annular groove 50 and substantially to cut off the supply of this sealing fluid when the machine operates under low ventilating gas pressure conditions. Failure of the sealing liquid supplied to the main seal resulting in failure of this seal also will cause the bellows 55 to operate the valve 53 to supply sealing liquid to the second seal 50. The operation of the liquid seal formed by the sealing liquid passing from the annular groove 50 is similar to the operation of the seal formed by the liquid passing from the annular groove 47, as explained above. The sealing arrangement also includes an annular groove or recess 60 for collecting sealing liquid which flows toward the bearing. This recess is formed in the bearing face 30 of the bearing element 15 adjacent the outer side of the annular sealing groove 50, and the various walls formed on each side of the sealing groove 50 and on the inner side of the sealing passage 47 are arranged to carry a portion of the bearing load and to be aligned with the bearing on the spherical supporting surface 24.

In order to drain excess lubricant from the seal, a sealing liquid sump 61 is formed in the bearing housing 16 adjacent the interior of the casing 12 and the annular recess or groove 48 communicates with the sealing liquid sump 61 through several passages 62 in the lower portion of the annular sealing ring 42. The annular recess 60 communicates with the lubricant sump 36 through a drain passage 63 which communicates with another drain passage 64 extending through the bearing 15 and opening into the lubricant sump 36. The sealing liquid is adapted to be drained from the sealing liquid sump 61 through a drain pipe 65 connected to the sump and adapted to be connected to a suitable reservoir and recirculating system. In this manner, the opening in the casing through which the shaft of the machine extends is effectively sealed for different ventilating gas pressures within the casing, and gas is prevented from blowing through the seals from the casing under all operating conditions.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. In a machine provided with a gas filled enclosing casing and a rotatable member having a shaft extending through said casing, means for providing a main liquid seal about said shaft and for substantially preventing the escape of gas from said casing about said shaft, means for supplying sealing liquid under pressure to said seal, and means for providing a second seal about said shaft responsive to failure of sealing liquid pressure supplied to said main seal comprising a liquid seal supply means axially spaced from said first-mentioned seal for substantially preventing gas blowing through said seals from said casing.

2. In a machine provided with a gas filled enclosing casing and a rotatable member having a shaft extending through said casing, means for providing a liquid seal about said shaft and for substantially preventing the escape of gas from said casing about said shaft, means for supplying sealing liquid under pressure to said seal, means for providing a second seal about said shaft on the outer side of said first-mentioned seal comprising a liquid seal supply groove axially spaced from said first-mentioned seal, and means responsive to the relative pressure of gas in said casing and the sealing liquid pressure supplied to said first-mentioned seal for supplying sealing liquid to said second seal supply groove at such a pressure relative to the pressure of gas in said casing substantially to prevent gas blowing through said seals from said casing.

LLOYD P. GROBEL.